Figure 1:
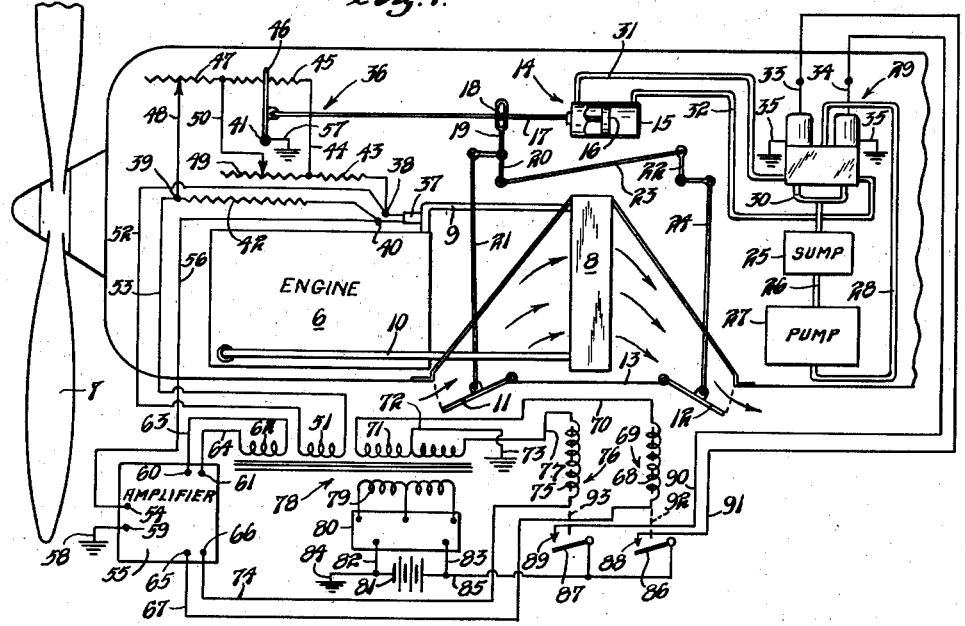

Dec. 4, 1945.  S. CRUM  2,390,425

CONTROL APPARATUS

Filed Oct. 14, 1942

INVENTOR.
STEPHEN CRUM
BY
George H. Fisher
ATTORNEY

Patented Dec. 4, 1945

2,390,425

UNITED STATES PATENT OFFICE 2,390,425

CONTROL APPARATUS

Stephen Crum, Minneapolis, Minn., assignor to Minneapolis-Honeywell Regulator Company, Minneapolis, Minn., a corporation of Delaware Application October 14, 1942, Serial No. 461,967

2 Claims. (Cl. 121—40)

This invention relates to condition control apparatus generally but more particularly to novel improvements in valve control apparatus, as applied, for example, in temperature control systems for aircraft.

In certain types of aircraft scoops are provided for directing a flow of air to be used for cooling purposes. For example, in the case of aircraft employing liquid-cooled engines, the scoops direct a flow of air through the radiator of the cooling system. The amount of cooling is controlled by adjusting the scoops which are pivotally mounted so as to project from the sides of the aircraft in which position exceedingly high pressures are exerted upon the scoops. Accordingly, it is imperative that the means for adjusting the scoops be capable of maintaining the same in an adjusted position in order that a substantially constant engine temperature may be maintained. Moreover, it is further desirable that the adjusting means be susceptible of fine adjustment in order that the scoops may be positioned in accordance with small temperature variations, thereby providing a sensitive control system.

In the co-pending application of Willis H. Gille, Serial No. 439,673, filed April 20, 1942, a temperature control system for aircraft is disclosed in which an electric motor actuates a poppet valve through a plurality of cam means. The valve controls the flow of fluid under pressure to a reversible hydraulic servo-motor which in turn motivates the temperature control flaps.

In the co-pending application of Hubert T. Sparrow, Serial No. 461,956, filed Oct. 14, 1942, a temperature control system for aircraft is disclosed in which a solenoid actuated piston valve controls the flow of fluid under pressure to a reversible hydraulic servo-motor which in turn motivates the temperature control scoops of the aircraft.

The present invention contemplates an aircraft temperature control system in which a solenoid actuated poppet valve controls the flow of fluid under pressure to a reversible hydraulic servo-motor which in turn motivates the scoops of the aircraft. The present invention combines the desirable inherent sealing characteristic of poppet valves with the effective, positive, and reliable action of a solenoid motive means to provide an inexpensive and expeditious valve control structure.

A broad object of the present invention, there, is generally to provide improvements in temperature control systems for aircraft.

Another object of this invention is to provide a novel valve control apparatus which is particularly adaptable for use in aircraft control systems.

A further object of the present invention is to provide a novel valve structure comprising a pair of solenoid actuated poppet valves and a pair of check valves which prevent fluid flow through the valve when the solenoid valves are deenergized and provide fluid flow through the valve in opposite directions when the solenoid valves are selectively energized.

Figure 2:
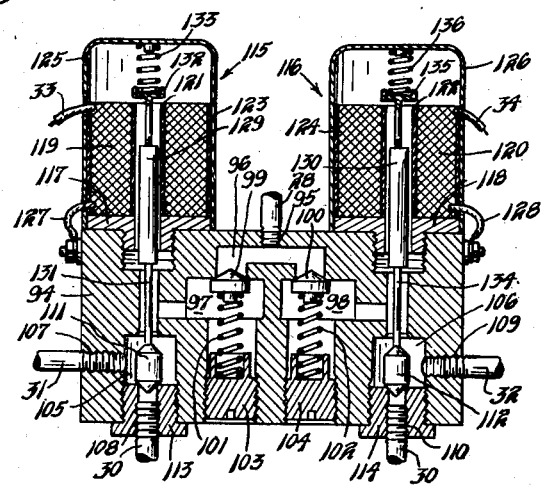

Still other objects are those expressly stated or implied in the following specification and claims reference being had to the accompanying drawing, in which:

Figure 1 illustrates diagrammatically the application of my invention to an aircraft engine temperature control system, and Figure 2 is a sectional elevational view of the solenoid valve structure diagrammatically shown in Figure 1.

Referring to Figure 1 in which a portion of an airplane is shown diagrammatically in elevation, the numeral 6 generally designates an engine of the liquid cooled type for driving a propeller 7. The engine 6 is cooled by a suitable fluid, such as Prestone, which is circulated through the engine and a radiator 8, the radiator being connected to the engine by suitable conduit 9, 10 in the usual manner.

The fluid in the radiator 8 is cooled by the passage of air therethrough, and the amount of cooling is controlled by a pair of scoops 11, 12 which are pivotally mounted on the cowl 13 of the airplane in such a manner as to be pivotally adjustable outwardly of the cowl. The front scoop 11 admits the air which flows through the radiator 8 in the direction of the arrows and the rear scoop 12 serves as a discharge port for the air as clearly seen in the drawing.

A reversible hydraulic servo-motor 14, of conventional design is provided for adjusting the scoops 11, 12. The motor 14 comprises a cylinder 15 and a piston 16 mounted for reciprocative movement in the cylinder. A piston rod 17 is secured to the piston 16 and extends through an end of the cylinder 15 in fluid tight relation therewith.

The piston rod 17 carries a transverse pin 18 by means of which the rod makes a driving connection with a slotted arm 19 of a bell crank 20. One arm of the bell crank 20 is connected to the scoop 11 by a link 21, and the other arm is connected to a first arm of a second bell crank 22 by a link 23. The other arm of bell crank 22 is connected by a link 24 to scoop 12. With the above bell crank arrangement, it is obvious that both scoops 11, 12 may be adjusted to the same extent for each movement of the piston 16.

Fluid for operating the motor 14 is supplied by a low pressure receiver or sump 25. The fluid is drawn from the sump through conduit 26 to the pump and pressure chamber 27 and thence supplied under pressure through conduit 28 to a solenoid actuated control valve generally designated 29. Conduit 30 is provided for the return of low pressure fluid from the valve 29 to the sump 25. Also leading from the valve 29 are conduits 31, 32 which communicate with the left and right ends of the cylinder 14 respectively.

The valve 29 is provided with a pair of electric lead wires 33, 34 and may be grounded to the airplane structure in any convenient manner being schematically grounded through grounded connections 35 as shown in the drawing. As will hereinafter appear, when a circuit is completed through the terminal 33 to ground, the valve 29 provides a fluid flow causing the piston 19 to move to the left. When a circuit is completed through the terminal 34 to ground the valve 29 provides a fluid flow causing the piston 16 to move to the right. Upon deenergization of the valve 29 all of the parts leading therefrom are automatically closed thereby hydraulically locking the piston 16 in its adjusted position.

It is to be understood that any convenient means may be employed for controlling the energization of the valve 29. Such means may comprise manually controlled switch means disposed at the pilot's station, or automatic means responsive to engine temperature which may, for example, be a three wire temperature control system or a follow-up control system of the balanced circuit or bridge type.

In the drawing a bridge circuit, generally designated by the numeral 36, is shown as best being illustrative of the principles involved in my invention. The bridge circuit 36 comprises a temperature responsive resistance element 37 which is preferably inserted into the conduit 9 at the point where the hot fluid leaves the engine, as shown. The circuit 36 further comprises input terminals 38, 39, and output terminals 40, 41.

A first arm of the bridge circuit 36 includes the temperature responsive element 37 which is connected between the input terminal 38 and output terminal 40. The second arm of the bridge circuit is connected between the output terminal 40 and the input terminal 39 and includes a fixed resistor 42. The third arm of bridge circuit 36 is connected between input terminal 38 and output terminal 41 and includes a fixed resistor 43, a conductor 44, that portion of a slide wire resistor 45 between its right hand terminal and its cooperating slider 46, and slider 46. The fourth arm of the bridge circuit 36 includes slider 46, that portion of slide wire resistor 45 between its left hand terminal and the slider 46, a variable resistor 47, and a conductor 48, the fourth arm being connected between the output terminal 41 and the input terminal 39. Slide wire 45 and slider 46 comprise a rebalancing potentiometer for the bridge circuit 36, the slider 46 being operatively connected to the piston rod 17, as shown, to provide a follow-up function. The purpose of resistor 47 is to provide means for adjusting the control point of the system. Adjustment of the resistor 47 determines that temperature of the fluid in conduit 9 adjacent to element 37 which causes the bridge circuit 36 to be balanced for a given position of the slider 46 with respect to the slide wire 45. A variable resistor 49 and conductor 50 are connected in parallel with the conductor 44 and slide wire resistor 45. The purpose of resistor 49 is to provide means for regulating the amount of movement of slider 46 necessary to correct a given unbalance of the bridge circuit 36.

Bridge input terminals 38, 39 are connected to a transformer secondary winding 51 through conductors 52, 53 respectively. Bridge output terminal 40 is connected to an input terminal 54 of an electronic amplifier 55 through a conductor 56. Amplifier 55 may be of any desired type but is preferably of the type disclosed in Figure 2 of the co-pending application of Albert E. Upton, Serial No. 437,561 filed April 3, 1942. Output terminal 41 of bridge circuit 36 is connected through ground connections 57 and 58 to amplifier input terminal 59.

Amplifier 55 has a pair of power supply terminals 60 and 61 which are connected to a transformer secondary winding 62 through conductors 63, 64, and a pair of selectively energizable output terminals 65 and 66. Input terminal 59, through ground connections 58, serves as a common return terminal for the output terminals 65 and 66.

Output terminal 65 is connected through a conductor 67, a winding 68 of a relay 69, a conductor 70, one-half of transformer secondary winding 71, and a conductor 72 to ground at 73.

Output terminal 66 is connected through a conductor 74, a winding 75 of a relay 76, a conductor 77, the other half of transformer secondary winding 71 and thence through conductor 72 to ground at 73.

Transformer secondary windings 51, 62 and 71 comprise parts of a transformer generally designated by the numeral 78. Transformer 78 further comprises a primary winding 79 which is supplied with alternating current by means of an inverter 80 of any well-known type. The inverter is supplied with direct current from a battery 81 through conductors 82, 83.

The negative side of the battery 81 is grounded through connections 84. The positive side of the battery is connected through a conductor 85 with movable contacts 86 and 87 of relays 69 and 76 respectively. The fixed contacts 88 and 89 of relays 69 and 76 are connected through conductors 90 and 91 with terminals 34 and 33, respectively, of control valve 29.

When the relays 69, 76 are deenergized, the contacts 86, 88 and 87, 89 assume the open position, as seen in the drawing, by any suitable means such as spring return means. When the relay 69 is energized, a plunger 92 drives the contact 86 into engagement with the contact 88, and when the relay 76 is energized, a plunger 93 drives the movable contact 87 into engagement with the contact 89.

Referring now to Figure 2 in which the control valve 29 is shown in detail, it is seen that the valve comprises a valve body 94 which may be formed by casting or fabricating the same or by any other convenient means.

The valve body 94 comprises an inlet port 95 to which the conduit 28 is secured. Port 95 communicates with an inlet chamber 96 which in turn communicates with a pair of intermediate chambers 97 and 98. Disposed between the inlet chamber 96 and intermediate chambers 97, 98 are a pair of check valves 99, 100 for controlling fluid flow between the chambers.

The check valves 99, 100 are maintained in position, as shown, by a pair of coil springs 101, 102 which may conveniently be seated in plugs 103, 104 threaded into the valve body 94, as shown. From the foregoing it is obvious that if the fluid pressure in chamber 96 exceeds that in the chambers 97, 98 and the force exerted by the springs 101, 102, that the valves will yieldably permit fluid flow from the inlet to the intermediate chambers. On the other hand, when the pressures in the chambers are equal the compression of the springs 101, 102 securely seats the valves 99, 100 to prevent fluid flow from the intermediate to the inlet chamber.

The intermediate chambers 97, 98 communicate with a pair of control chambers 105, 106 respectively. Leading from the control chamber 105 is a control port 107 to which the conduit 31 is secured, and an exhaust port 108 to which the conduit 30 is secured. In like manner, a control port 109 to which the conduit 32 is secured and an exhaust port 110 to which conduit 30 is secured, lead from the control chamber 106.

Communication between the intermediate chamber 97 and control chamber 105 and between the control chamber 105 and the exhaust port 108 is controlled by a double faced poppet valve 111. In like manner, communication between the intermediate chamber 98 and control chamber 106 and between the control chamber 106 and the exhaust port 110 is controlled by a poppet valve 112 which may be identical with valve 111.

To facilitate the assembly of the valve 29 and the machining of the proper seats for the valves 111, 112, the control ports 105, 106 may extend outwardly of the valve body 94 and be closed by plugs 113, 114 through which the ports 108, 110 may extend as shown.

The valves 111, 112 are actuated by a pair of solenoid assemblies 115, 116 which may be identical. Each assembly 115, 116 comprises a magnetic disc 117, 118 which are secured in fluid tight relation to the valve body 94. Supported on the discs 117, 118 are a pair of solenoid windings 119, 120 having centrally thereof non-magnetic tubing 121, 122 and outwardly thereof insulation material 123, 124 to insulate the windings from their respective housings 125, 126 which are pressed to discs 117, 118 respectively.

Leads 33 and 127 for winding 119 are brought through housing 125 in any suitable fluid tight manner, the lead 127 being grounded to the valve body 94 as shown. Similarly, leads 34 and 128 for winding 120 are brought out through housing 126 in any suitable fluid tight manner, the lead 129 being grounded to the valve body 94 as shown.

Cooperatively associated with the windings 119, 120 are magnetic plungers 129, 130 respectively. The plunger 129 is connected to the valve 111 by a stem 131, and the upper end of the plunger 129 carries a pedestal 132 upon which is supported a coil spring 133. The spring 133 bears against the housing 125 to bias the valve 111 to close the port 108. Similarly, the plunger 130 is connected to the valve 112 by a stem 134 and carries on its upper end a pedestal 135 upon which is supported a coil spring 136. The spring 136 bears against the housing 126 to bias the valve 112 to close the port 110.

It is to be noted that the intermediate chambers 97, 98 communicate with the solenoid assemblies 115, 116. Accordingly, the fluid is free to circulate through the windings 119, 120 to cool the same as well as to lubricate the moving parts.

When the windings 119, 120 are deenergized, the valves 111, 112 close the ports 108, 110 leading to the low pressure sump 25. Accordingly, the check valves 99, 100 permit a one-way fluid flow until the pressure of the fluid in the valve 29 and cylinder 15 is everywhere the same and equal to the pressure of the fluid in the pump 27. When this static pressure condition is reached the valves 99, 100 close under power of their associated springs 101, 102 respectively. Any tendency of the piston 16 to move when this condition is reached tends only to further seat the valves 99, 100, 111, 112 due to the inherent seating characteristics of poppet valves. When one or the other of solenoids 115, 116 is energized, the static pressure condition is unbalanced upon the opening of the low pressure or exhaust port controlled by th' solenoid energized. Direct communication between the inlet port and the exhaust port thus opened is cut off by the valve actuated. However, communication is established from one side of the piston 16 through the control chamber of the energized solenoid, thus reducing such pressure. The piston then moves and this reduces the pressure in the control chamber of the deeneregized solenoid. The proper check valve then permits fluid flow into the control chamber of the deeneregized solenoid.

The amplifier 55 is so constructed that when an alternating signal of a predetermined phase is applied to the input terminals 54 and 59, that branch of the output circuit extending through output terminal 65 and relay 69 is energized. When an alternating current signal of the opposite phase is applied to input terminals 54 and 59, the other branch of the output circuit including terminal 66 and relay 76 is energized. It will therefore be apparent that the relays 69 and 76 are selectively energized in accordance with the direction of unbalance of the bridge circuit 36.

In operation, with the parts in the position shown in the drawing, the scoops 11, 12 are half way open and the engine 6 is at the desired temperature. Let it be assumed that the temperature adjacent the temperature responsive element 37 increases above the desired value. This increases the resistance between input terminal 38 and output terminal 40 of bridge circuit 36 which unbalances the bridge in such a direction that an alternating potential is applied to amplifier 55 with the proper phase relationship to cause energization of the relay winding 68. Energization of relay winding 68 causes contact 86 to move into engagement with contact 88, thereby completing an energizing circuit for winding 119 which may be traced as follows: from battery 81, through conductor 85, contacts 86, 88, conductor 91, lead 33, winding 119, and hence through ground connections 127, 35 and 84 back to battery 81. Upon energization of winding 119 the plunger 129 is drawn upwardly moving the valve 111 out of engagement with the port 108 and into a position to close off communication between chambers 97 and 105. Upon opening of port 108, communication is established between the left-hand end of cylinder 15 and the sump 25 by way of conduit 31, chamber 105, the port 108, and conduit 30. The pressure on the left-hand side of piston 16 is thereby reduced and the piston starts moving towards the left. Such leftward movement of the piston reduces the pressure on the right-hand side of the piston which is in communication with the intermediate chamber 98 by way of conduit 32, chamber 106, and the intermediate chamber 98. As a result of this reduction in pressure, the high pressure fluid coming from pump 27 by way of conduit 28 and inlet chamber 96 forces open check valve 100 to let more fluid into this portion of the system, thereby again building up the pressure on the right-hand side of piston 16. Piston 16 thus continues moving to the left. Such movement of piston 16 to the left drives the slider 46 to the left, thereby increasing the resistance between bridge input terminal 38 and output terminal 41. When this increase has been sufficient to balance the increased resistance between input terminal 38 and output terminal 40 due to the increase in engine temperature, the bridge is again balanced, whereupon relay 69 is deenergized. This deenergizes winding 119 and returns valve 111 to the position shown in Figure 2. The piston 16 is now hydraulically locked in its new position. This leftward movement of the piston 16 which has just taken place also moved scoops 11 and 12 further open so as to increase the circulation of cooling air over the radiator 8. In this manner, every rise in engine temperature is accompanied by a corresponding opening movement of scoops 11 and 12.

If the engine temperature decreases below the value it is desired to maintain, the bridge 36 is unbalanced in the opposite direction, thereby causing energization of winding 75 of relay 76. Energization of relay 76 causes the engagement of contacts 87, 89 thereby completing a circuit to winding 120 which may be traced as follows: from battery 81 through conductor 85, contacts 87, 89, conductor 90, lead 34, winding 120, and through ground connections 128, 35, and 84 back to battery 81. Upon energization of winding 120, plunger 130 is drawn upwardly moving valve 112 out of engagement with the port 110 and into a position to close off communication between chambers 98 and 106. Opening of port 110 establishes communication between the right-hand side of piston 16 and the sump 25 by way of conduit 32, the now open port 110 and conduit 30. The pressure on the right-hand side of piston 16 is thus reduced and the higher pressure on the left-hand side thereof begins moving piston 16 to the right. This higher pressure is contained within the closed portion of the system comprised by the conduit 31, the control chamber 105, and the intermediate chamber 97. As this pressure drops sufficiently, the high pressure from pump 27 going through conduit 28 to inlet chamber 96 will force open check valve 99 to permit further fluid to flow into this portion of the system.

Such right-hand movement of piston 16 moves slider 46 to the right and also moves scoops 11 and 12 towards closed position. Such movement of slider 46 tends to rebalance the bridge circuit. When the bridge circuit has been completely rebalanced, relay 76 is deenergized which in turn deenergizes winding 120 and returns valve 112 to the position shown in Figure 2. The piston 16 is thereby again hydraulically locked in its new position and the scoops 11 and 12 are maintained more nearly closed so as to reduce the flow of air through the radiator 8 to thereby lessen the cooling effect on the engine 6.

From the foregoing, it will be apparent that I have provided a novel solenoid actuated poppet valve mechanism in combination with the requisite check valves and piping to bring about a system in which the servo-motor is hydraulically locked in each and every new position which it assumes as a result of changes in the temperature of the cooling fluid for the engine. While I have shown and described but a single embodiment of my invention, many changes may be made by those skilled in the art without departing from the spirit thereof and I therefore intend to be limited only by the scope of the claims appended hereto.

I claim as my invention:

1. A valve for controlling fluid flow, comprising in combination, a valve body, an inlet port, a pair of control ports in communication with said inlet port, a pair of spring loaded check valves intermediate said inlet and said control ports, a pair of outlet ports in communication with said inlet and said control ports, a control valve intermediate said inlet and each outlet port and controlling the direction of flow through said control ports, said control valves providing means including said check valves for normally resisting flow through the device in either direction, said means also including a solenoid actuating member in fluid tight association with said valve body and operably associated with each control valve, and spring means for returning and maintaining said control valves in normal position.

2. In a control apparatus, comprising in combination, a cylinder and piston, a valve housing operably associated with said cylinder and said piston, said housing having an inlet port, outlet ports and control ports in communication with said inlet port, a normally closed spring loaded check valve positioned between said inlet port and each of said control ports, a control valve disposed intermediate each check valve and the outlet port associated therewith, said control valves being disposed to normally provide an equalized pressure in opposed ends of said cylinder, said control valves also providing means for selectively bleeding either end of said cylinder to cause operable movement of said piston in relation to said bleeding, said check valves and said control valves when in normal position providing means for hydraulically locking said piston against movement, means for operating said control valves independently of each other and said check valves, and said check valves being disposed to operate independently of said control valves.

STEPHEN CRUM.